United States Patent [19]
West

[11] Patent Number: 5,458,428
[45] Date of Patent: Oct. 17, 1995

[54] CANTILEVER MOUNTING SYSTEM

[76] Inventor: Ronald R. West, 545 E. 200 North, Provo, Utah 84606

[21] Appl. No.: 188,713

[22] Filed: Jan. 31, 1994

Related U.S. Application Data

[63] Continuation-in-part of Ser. No. 856,639, Mar. 24, 1992, Pat. No. 5,307,598.

[51] Int. Cl.$^6$ ..................................................... F16B 2/22
[52] U.S. Cl. ......................... 403/252; 403/256; 403/263; 403/2; 248/146
[58] Field of Search ................................... 403/263, 262, 403/252, 247, 253–256, 230, 294, 319, 2, 49, 257, 409.1; 256/65–66, 68, 70, 19, 22, 59, DIG. 5; 52/668, 665, 731.3, 732.2; 404/10; 232/39, 38, 17; 248/146, 121

[56] References Cited

U.S. PATENT DOCUMENTS

| | | |
|---|---|---|
| 317,896 | 5/1885 | Vinton . |
| 632,966 | 9/1899 | Mullenix . |
| 1,083,582 | 1/1914 | Bates . |
| 1,877,074 | 9/1932 | Stanziale . |
| 2,222,249 | 11/1940 | Borgen ......................... 256/48 |
| 3,011,597 | 12/1961 | Galloway et al. . |
| 3,152,668 | 10/1964 | Smith . |
| 3,180,663 | 4/1965 | Lehmann ..................... 403/263 X |
| 3,186,523 | 6/1965 | Brisse . |
| 3,300,237 | 1/1967 | Rolen ........................... 403/256 |
| 3,462,126 | 8/1969 | Demanega ..................... 256/65 |
| 3,676,965 | 7/1972 | Deike . |
| 3,698,144 | 10/1972 | Stratton ........................ 403/2 X |
| 3,955,801 | 5/1976 | Soriero, Jr. ................... 256/65 |
| 4,149,701 | 4/1979 | Densen ......................... 256/65 |
| 4,320,608 | 3/1982 | Deike . |
| 4,339,899 | 7/1982 | Klenk et al. . |
| 4,603,520 | 8/1986 | Deike . |
| 4,759,161 | 7/1988 | Kucyk et al. . |
| 4,867,421 | 9/1989 | Vernon ....................... 256/DIG. 5 X |
| 5,307,598 | 5/1994 | West ............................. 404/10 X |

FOREIGN PATENT DOCUMENTS

| | | | |
|---|---|---|---|
| 1300613 | 6/1962 | France ............................ 403/254 |
| 245462 | 5/1987 | Germany ......................... 403/256 |
| 2106609 | 4/1983 | United Kingdom ............. 403/409.1 |

OTHER PUBLICATIONS

Nikon Crop. of Japan Part No. AX-1 and AX-1S.

Primary Examiner—Dave W. Arola
Assistant Examiner—Harry C. Kim
Attorney, Agent, or Firm—M. Reid Russell

[57] ABSTRACT

A cantilever mounting system for mounting a tube to a post to extend at approximately a right angle from the post that is maintained in a vertical attitude to the ground. The erected post can be utilized as a fences post, sign post, mail box post, or the like, and can be used for mounting the tube, or the like, that may be intended for receiving delivered items, such as mail and/or newspapers, and the tube includes at least one tab extending from one tube end that is for fitting into a slot that includes at least one hole formed therethrough. The tab hole is for receiving a peg type fastener that is fitted through the hole and blocks withdrawal of the tab from the slot to provide the tube cantilever mounting. The peg type fastener includes an arrangement for inhibiting peg withdrawal from the tab hole, and, in its manufacture, the peg may be weakened to promote shearing thereacross as when a force is applied against the tube as could damage the tube and post, the peg shearing allowing release of the tube tab out of the post slot.

8 Claims, 11 Drawing Sheets

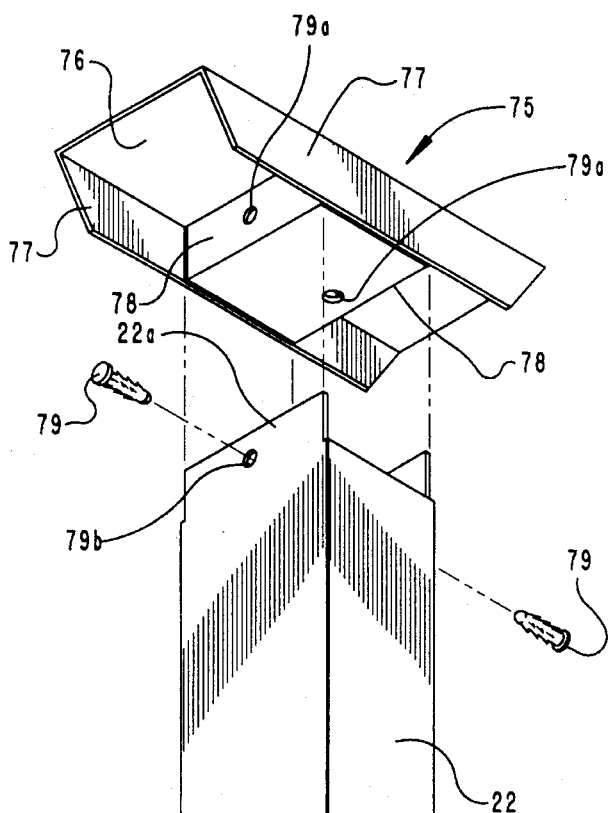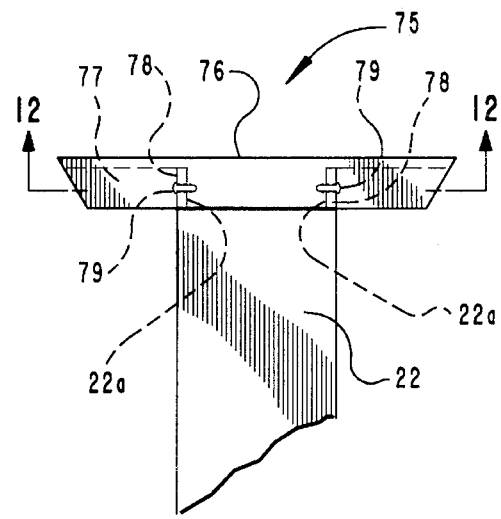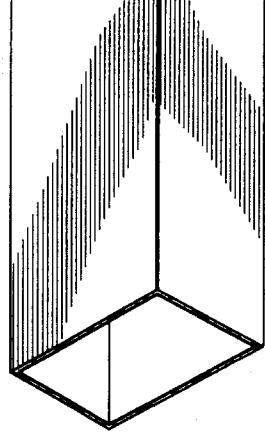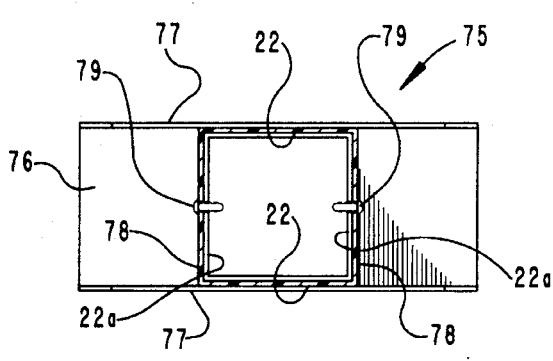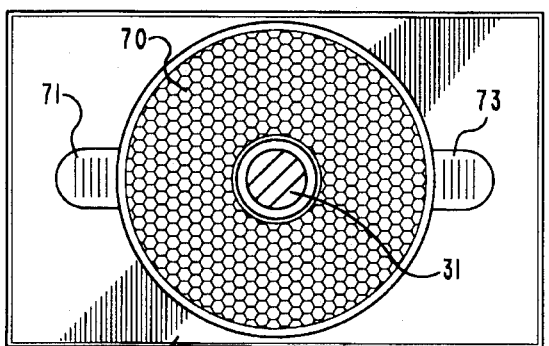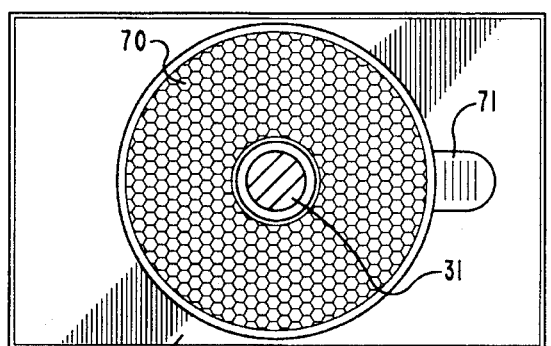

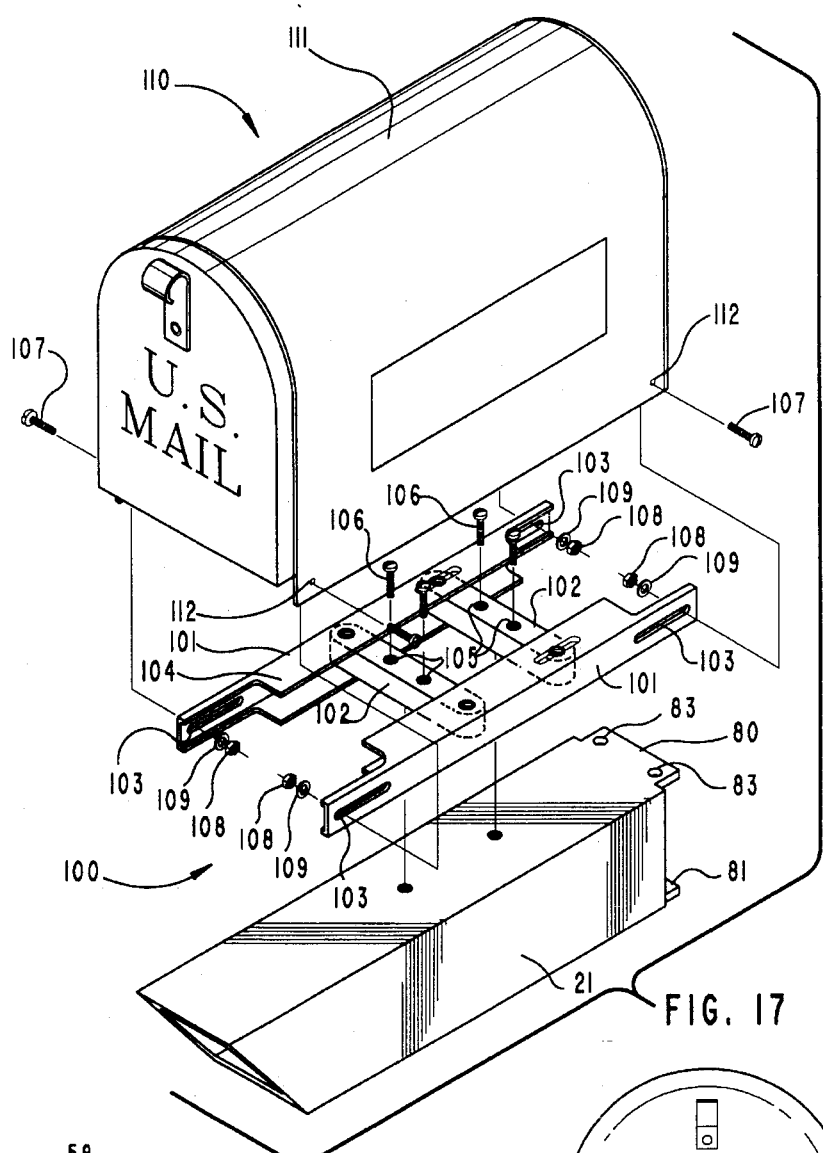
FIG. 17
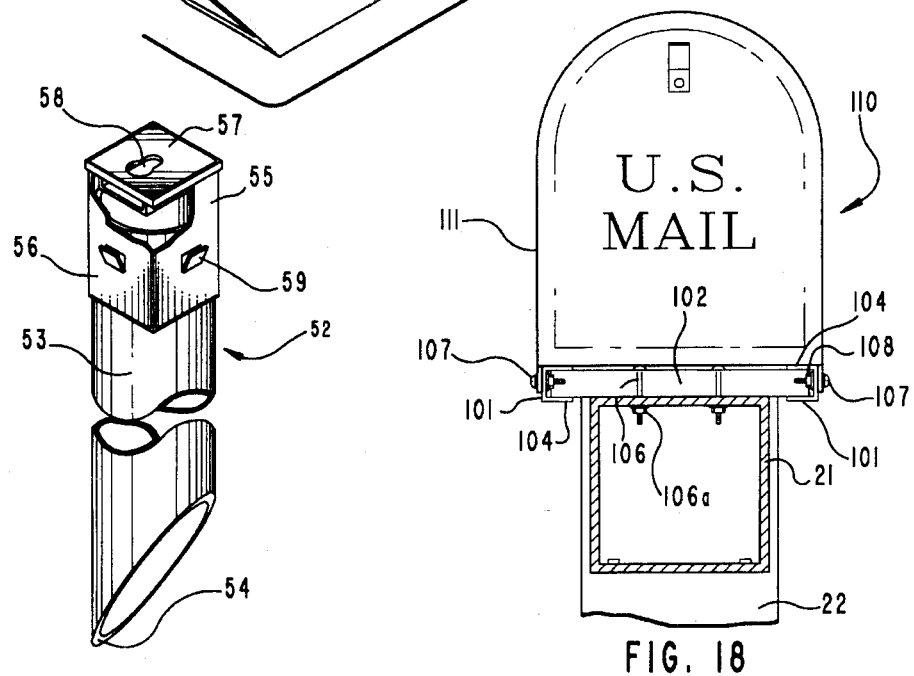
FIG. 14
FIG. 18

CANTILEVER MOUNTING SYSTEM

BACKGROUND OF THE INVENTION

The present application is a continuation in part application of application Ser. No. 07/856,639, filed Mar. 24, 1992, U.S. Pat. No. 5,307,598.

FIELD OF THE INVENTION

This invention related to adjustable mounting systems and in particular to tube mounting systems for cantilever coupling of a tube onto a vertical post.

PRIOR ART

Posts and even ground mounting arrangements therefor for adjusting or tilting the post to a vertical attitude are not new. A recent patent to Deike, U.S. Pat. No. 4,603,520, shows an example of a mounting base for a sign post that will accommodate rotational, tilting and height adjustment. Where, like one embodiment the present invention, the Deike patent shows a ball and seat arrangement for providing tilting capability to a sign post, Deike utilizes four corner bolts to maintain that post tilted attitude rather than a ball and seat with a single bolt mounting like that of the present invention. Further, there is no teaching of a mail or newspaper box mounting to the mounting post in the Deike patent.

Additionally, a number of ground anchor arrangements for mounting posts, such as road side type sign posts, have been developed. Examples of such are shown in a U.S. Patents to Galloway, et al, U.S. Pat. No. 3,011,597, that involves an auger type post mount; Smith, U.S. Pat. No. 3,152,668, that teaches an anchor with a guy wire; Brisse, U.S. Pat. No. 3,186,523, that shows a wire anchoring system; Deike, U.S. Pat. Nos. 3,676,965 and 4,320,608, for sign post support sockets; and Klenk, et al U.S. Pat. No. 4,339,899, that sets out a system for coupling a power transmission tower to a support base. None of which above cited patents involve a post and ground mount for a mail box system, like that of the present invention, whereby the post can be quickly and easily aligned to the vertical and provide for securely mounting a mail box, or the like, onto which post.

Additional to the above cited U.S. patents, a ball and socket mount utilizing a single bolt and nut combination for positioning and securing a transit to a horizontal attitude is provided in a transit system identified as an automatic level, manufactured by Nikon Corp. of Japan, Manufacturers Part No. AX-1 and AX-1S. Which Nikon system is, of course, for a different use and application than the arrangement of the system of the present invention.

SUMMARY OF THE INVENTION

It is a principal object of the present invention to provide a unique peg arrangement for use in a right angle mounting of a mail or newspaper tube cantilevered outwardly from a vertical post.

Another object of the present invention is to provide a peg arrangement maintained to provide a bar or friction mount locking when installed, restricting removal.

Another object of the present invention is to provide a peg arrangement for use in a cantilever mounting of a tube to a post that is arranged to shear, to release the tube from the post should the tube receive a force directed against the side thereof as could damage the tube and post.

Still another object of the present invention is to provide a peg arrangement that is simple and inexpensive to produce and install by a person having only rudimentary tools and little or no mechanical skills.

The present invention is for use with an inexpensive, simple to install and yet durable post system. The post system includes a ground stake to be driven into the earth, mounted in cement, or the like. Which ground stake includes and arrangement for connecting, at an upper surface thereof, an adjustable mount wherefrom a post insert extends. Which post insert attitude to the vertical is adjustable and is maintained by a mounting that utilizes single nut and bolt fastener.

In one embodiment of the invention, the adjustable mount is a ball section and seat combination, where the ball section is maintained onto the top of the ground stake or anchor. The ball section to receive seat having a hemispherical inner surface that are positioned and held together by a single bolt coupling. The bolt is fitted through a hole formed through which seat and ball section, which ball section hole is tapered from a bottom end outwardly to a top end to allow for the bolt to tilt across the hole. So arranged, the seat is positionable across the ball section surface. A nut is provided for turning over a threaded end of which bolt within the post insert for clamping the seat onto the ball section surface. Alternatively, a friction gasket can be included therebetween, or the ball section surface can be grooved or scored for providing a non-slip coupling surface.

A second embodiment of which adjustable mounting involves a pair of sloping or tapered washers that are center holed to fit together as a stack and receive a bolt therethrough. Which bolt is also fitted through holes formed in opposing plates that are secured respectively, across the post insert bottom and the ground stake or anchor top surface. The washers fitted over one another have their tapered surface arranged juxtaposition to one another. The rotation of one of which washers over the other therefore increases or decreases, respectively, the thickness of the opposite washer stack edge. The washer stack top surface can therefore be angled to the vertical relative to its lower surface. Which angle translates to a tilt of the post, which post angle is maintained by turning a nut over which bolt threaded end.

The post insert is for receiving an end of a post, such as a post for mounting a mail box, fitted thereover. For which coupling, screw holes are formed through both the post and post insert that, with the post telescoped thereon, align to receive screws turned therethrough, securing the components together. Resilient spacers are preferably arranged between the opposing surfaces of which post and post insert to provide a tight coupling. Alternatively, the ball seat can be imbedded directly into the bottom of the post to eliminate the post insert.

The post can receive a mail box, or the like, secured across a top end thereof, may mount an open newspaper tube, or the like, cantilevered thereto, may be arranged as a fence post, or may be utilized for any function involving or requiring an upright, ground mounted post within the scope of this disclosure. A preferred cantilever mounting is provided by horizontally slotting the mail box post with a pair of parallel slots that are each to receive one of a pair of tabs formed as extensions of the tube end. Which tabs are holed, each hole to receive a peg that is formed to be easily manually fitted therethrough. The pegs are for binding in the tab holes to inhibit their withdrawal, and may include, as shown in one shear peg embodiment, a structurally weakened section thereacross along which the shear peg will shear to release the cantilevered tube, as when a significant force is applied to the tube as could damage the post if the tube is not released therefrom.

A mail box can be secured across the post top end utilizing a mount that includes a recess formed in the mount undersurface for receiving the post end, with screws turned through the contacting surfaces. Or, a frame for mount the mail box to the post end can be employed that is secured across the post end.

BRIEF DESCRIPTION OF THE DRAWINGS

These and other objects and features of the invention will become more apparent from the following description in which the invention is described in detail in conjunction with the accompanying drawings.

FIG. 4A shows a top plan sectional view of the top of the pair of tapered washers of FIG. 4 with tabs of which washers, that extend from a narrowest portion of each washer edge, extending oppositely;

FIG. 5A shows a top plan sectional view that is like that of FIG. 4A except that the tapered washer tabs are shown aligned over one another;

FIG. 10 shows a profile perspective view of an upper section of the post of FIG. 1, the top end thereof shown aligned for receiving a first embodiment of a mail box mount thereon;

FIG. 11 shows a side elevation sectional view of the assembled post top end and mail box mount of FIG. 10;

FIG. 12 shows a top plan sectional view taken along the line 12—12 of FIG. 11;

FIG. 14 shows a side elevation perspective view of the tubular ground anchor of FIG. 13;

FIG. 17 shows an exploded side elevation perspective view of a mail box, a frame mount and cantilevered tube of the present invention;

FIG. 18 shows an end view of the mail box, frame mount and cantilevered tube of FIG. 17 in their connected attitude mounted to a post;

DETAILED DESCRIPTION

Figures 1, 3B:
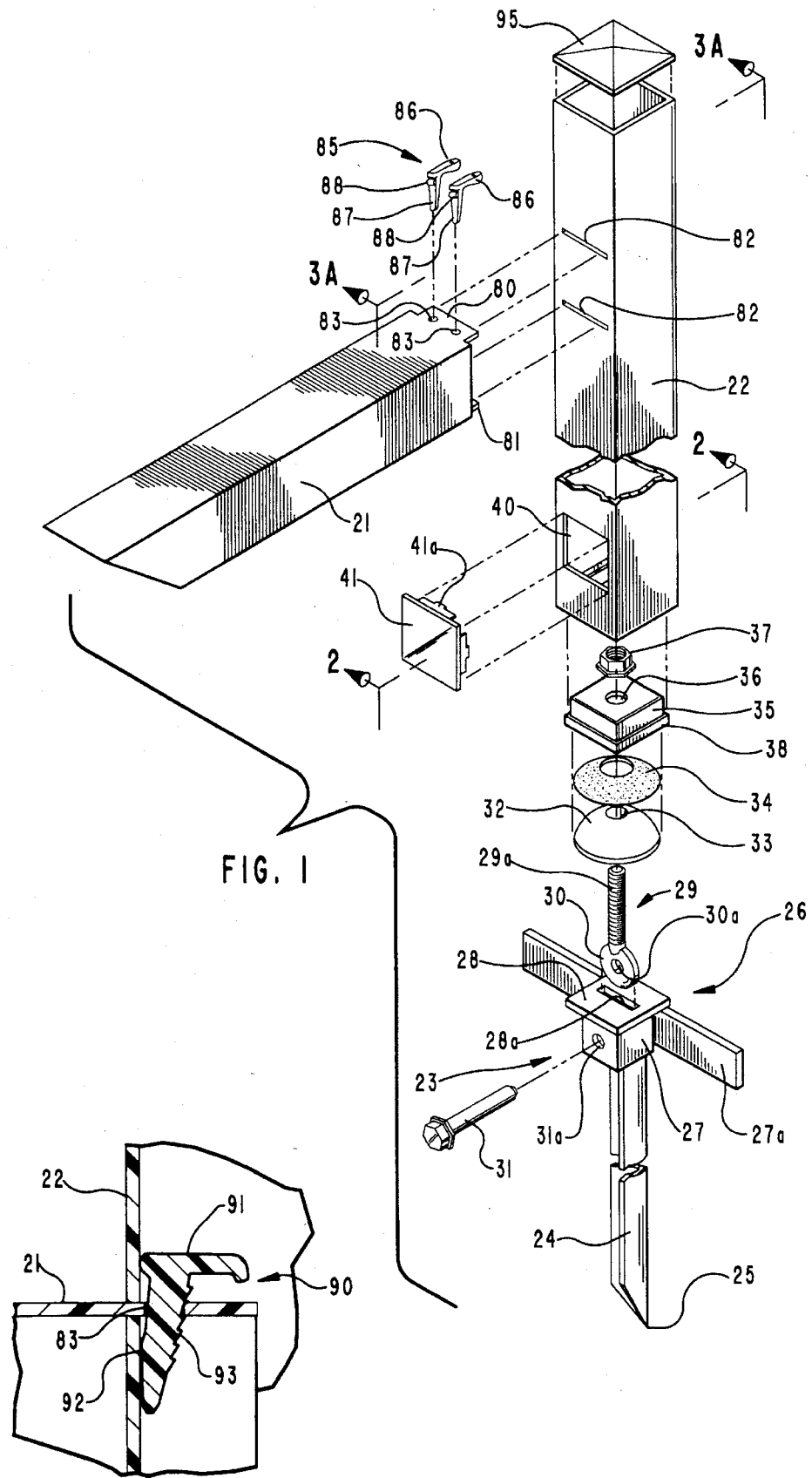
FIG. 1 shows an exploded side elevation perspective view of one embodiment of the post system of the present invention shown with ball segment and seat post to ground stake mounting and a tube cantilever mounted to an upper end thereof.
FIG. 3B shows an enlarged side elevation view of a peg of FIGS. 2 and 3A taken within the line 3B—3B of FIG. 3A.

The present invention is in a post system that includes a number of novel and unique elements. FIG. 1 shows an exploded profile perspective view of one arrangement of post system 20, hereinafter referred to as system. In FIGS.

1 and 2, the system 20 is shown used for mounting a mail or newspaper tube 21, hereinafter referred to as tube, cantilevered out from the side of a post 22. Which post 22, its ground mounting arrangements and fastener components, as set out hereinbelow, are also useful for mounting a mail box as shown in FIGS. 10 through 12, and 17 through 19. Though, of course, the system 20 and the other embodiments therein could be utilized as a post alone, for example a fence post, or could be used for mounting any item, within the scope of this disclosure.

Figure 8:
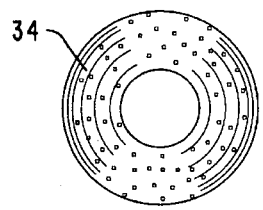
FIG. 8 shows a top plan view of a friction gasket for arrangement between the surfaces of the ball and seat segment of FIG. 7.

The system 20 of FIG. 1 includes a ground stake 23, shown as a section of angle iron 24 that is pointed at a lower end 25. The upper or top end of which angle iron section includes a cap 26 fixed thereover that is formed as a square tube with walls 27 with a flat plate 28 arranged thereover. The angle iron section 24 top end is telescoped into which square tube, one of which tube walls includes a bar 27a secured thereacross to present an anchor that binds into the ground wherein the ground stake is driven, inhibiting ground stake movement and withdrawal, as set out below. The flat plate 28 that is arranged across the square tube top end is shown as including a keyhole 28a, that allows an eye bolt 29 head end 30 to be fitted therethrough. Which head end 30 is holed at 30a to receive a bolt 31 fitted through a hole 31a formed in tube wall 27 and secured in the opposite tube wall. The eye bolt 29 is thereby secured to the square tube 26, a threaded end extending at a right angle upwardly from the flat plate 28. Shown in FIG. 1, the eye bolt 29 threaded end 29a is fitted through an open center portion or hole 33 of a ball segment 32. Which opening or hole 33 is tapered outwardly from a lesser diameter bottom end to a greater diameter top end, the bolt threaded end 29a thereby being free to swing across which hole 33 top end. The eye bolt 29 threaded end 29a is fitted through a gasket 34 that preferable has a like surface area to the ball segment 32 surface, as shown also in the top plan view of FIG. 8.

Figure 6:
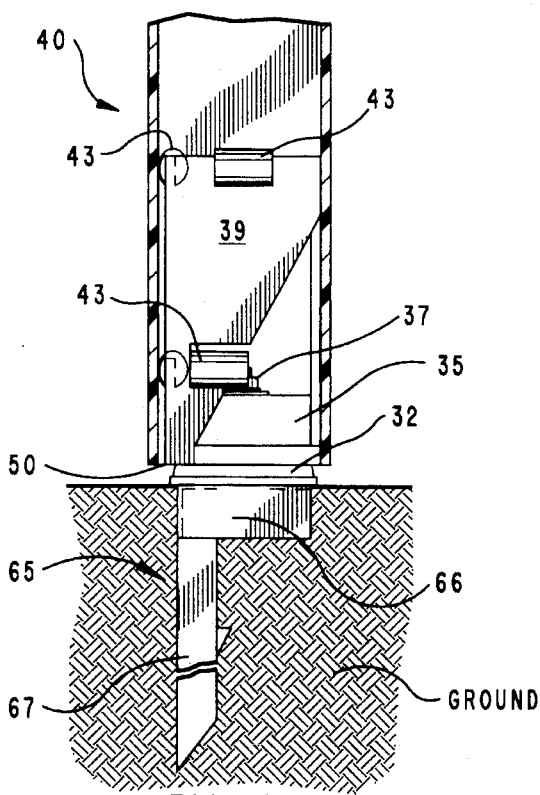
FIG. 6 shows a view like that of FIG. 4 except that a ball segment and seat mount like that of FIG. 1 is shown arranged between the ground anchor top and post insert bottom surfaces.
Figure 7:
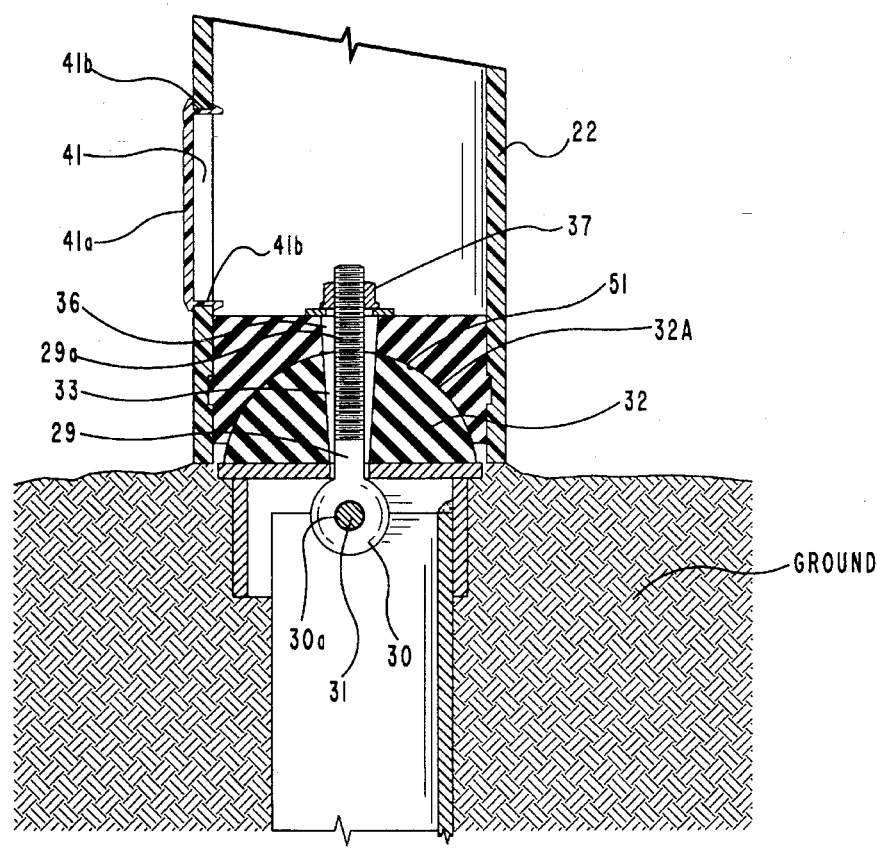
FIG. 7 shows an enlarged profile sectional view taken along the line 7—7 of FIG. 6 of the ball and seat segment mounting.
Figure 7A:
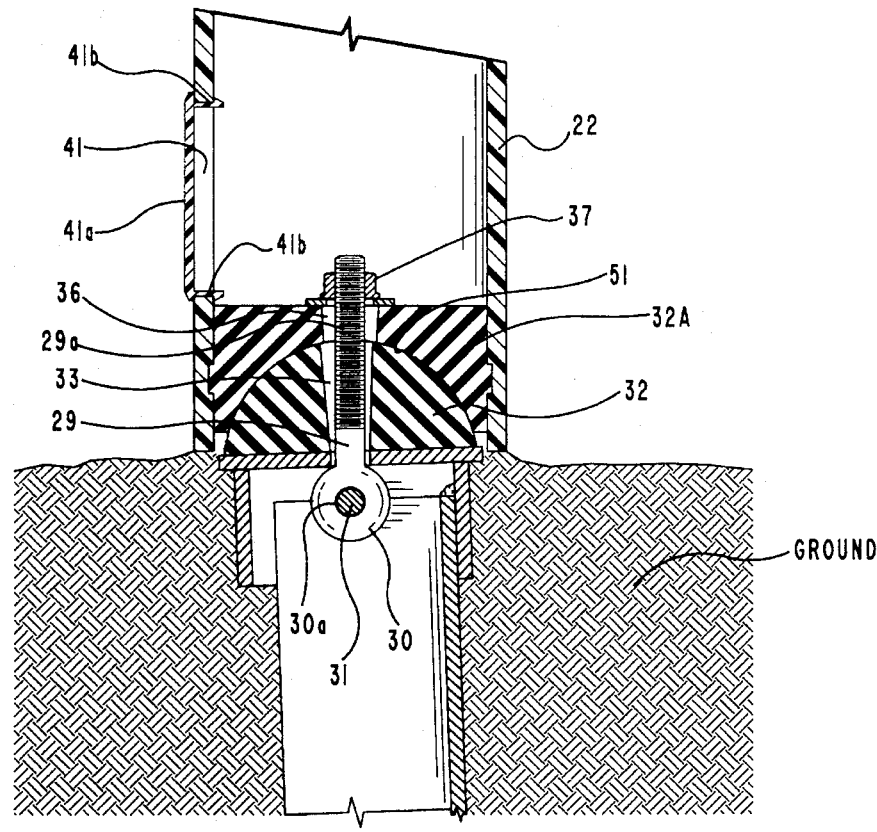
FIG. 7A shows a view like that of FIG. 7 except the seat is show moved out of center with the ball segment for aligning a connected post to the vertical.

Shown in FIGS. 1, 7 and 7A the eye bolt 29 threaded end 29a is for fitting through an adjustable mount that consists of ball segment 32 with tapered hole 33 and gasket 34 and a square post mount 35 containing a seat. The square post mount includes a center hole 36 that eye bolt 29 threaded end 29a is fitted through with a washered nut 37 turned thereover. The washered nut 37 turned on the eye bolt 29 couples the ball section 32 and seat together with gasket 34 therebetween providing a capability for adjusting the attitude to the vertical of a post 40 secured onto which square post mount 35, as set out hereinbelow. In another mounting embodiment, as shown in FIGS. 4 and 5, as well as the ball segment and seat mounting embodiment of FIG. 6, a post insert 39 is utilized for receiving post 39 telescoped thereover.

Shown in FIGS. 1, 7, 7A, 13 and 16, the post 22 is for telescoping over the square post mount 35, resting on a lip 38 formed around a lower edge of which mount, the post preferably secured thereon as by gluing, with a snap-in arrangement, or the like, in a manufacturing setting. For attaching the square post mount 35 onto the ball segment 32, the eye bolt threaded end 29a is fitted through the center hole 36, extending into the post 22. So arranged, an operator, not shown, positions the post 22 to a desired attitude to the vertical and fits the washer nut 37 through a portal 40 formed through the post side and onto the eye bolt threaded end 29a. He then turns and tightens that washer nut 37 onto the eye bolt threaded end 29a, compressing a seat 51 formed in the undersurface of which square post mount 35 tightly against the ball segment 32 surface, sandwiching gasket 34 therebetween, and locking the post 22 square post mount end in place with the ball segment 32. Which gasket 34 is formed of a course material to provide a non-slip surface between which ball segment surface and seat coupling. Thereafter, a window 41 having shoulders 41a is snapped into to cover over portal 40, completing mounting.

Figure 4:
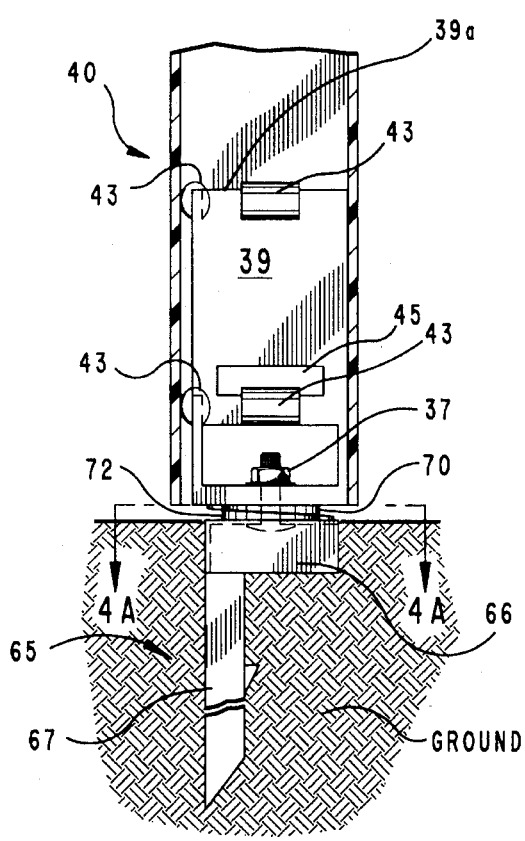
FIG. 4 shows a side elevation sectional view of another ground stake, post insert with post segment showing another embodiment of an adjustable post to ground stake mounting of the present invention shown as a pair of tapered washers that are positionable relative to one another into a stack, the washer relative positioning to one another providing a tilt to the vertical of the post insert.
Figure 5:
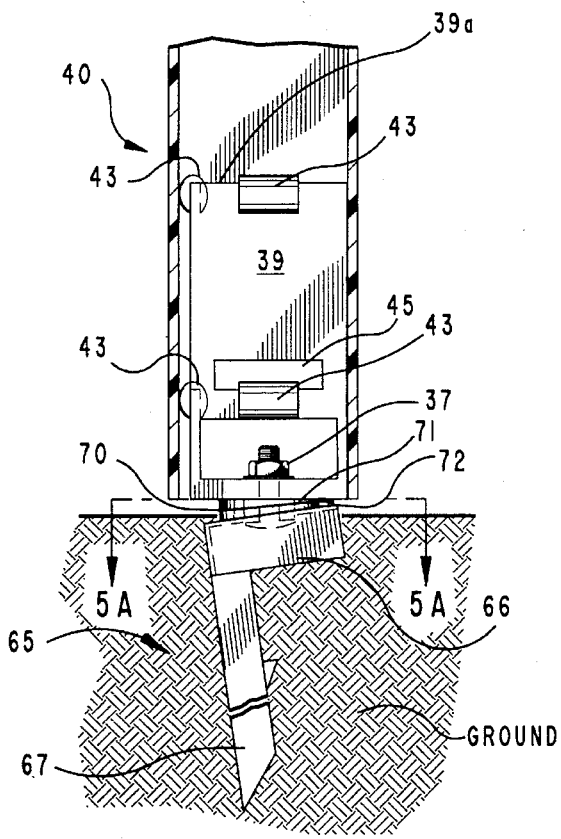
FIG. 5 shows a side elevation sectional view like that of FIG. 4 except that the ground anchor is shown tilted from the vertical, which tilt is shown corrected by the alignment of the tapered washers tabs, that provides a tilt to the washer stack, whereby the connected post is aligned to the vertical.

FIGS. 4 and 5, show another post 22 mounting embodiment that includes a post insert 39 that is a square open tube that utilizes a tapered washer stack, shown also in FIGS. 4A and 5A, as the post 22 mount rather than the ball segment seat, as discussed above. The post insert 39, like the post mount 35, is to receive the post 22 telescoped thereover, as set out and discussed hereinbelow. Further, it should be understood, other post mounts and tubes and tube configurations, such as round, could be so used within the scope of this disclosure.

Figure 9:
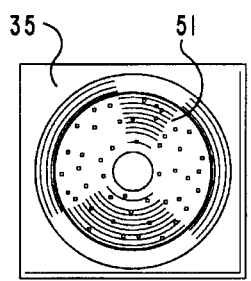
FIG. 9 shows a top plan view of a washer for fitting between the top of the seat segment and the bottom surface of which post insert seat of the adjustable mounting.

Shown best in FIGS. 7 and 7A, the ball segment seat 51 formed across the undersurface of the square post mount 35 of FIG. 1 is hemispherical in shape to conform to the surface of the ball segment 32. This seat 51 is also shown with the square post mount 35 of FIG. 6 and in the bottom plan view of FIG. 9. Further, it should be understood, where the ball segment seat 51 is set out above as formed in the square post mount 35 or across a lower end of the post insert 39, that seat can also be formed across a lower end of the post 22 itself, within the scope of this disclosure. Which post mounts of FIGS. 6, 7, 7A and 16, do not include the gasket 34, but instead employ a roughening at 32a of the ball segment surface to provide a friction surface therebetween, that is shown best in FIG. 16. A ball segment and seat coupling is thereby provided that allows the post 22 to be tilted across the ball segment 32 surface, as illustrated best in FIGS. 7 and 7A, for adjusting the post attitude relative to the top surface 28 of the ground stake 23.

FIGS. 4, 5 and 6, as set out above, utilize a post insert 39 that is adjusted to the vertical for receiving the post 22 end telescoped thereover. To maintain a secure coupling of which post insert 39 and post 40 end, spacers 43 are arranged between opposing surfaces of which post insert and post. Which spacers 43 are preferably each a saddle having a center slot with parallel legs thereacross and are formed from a resilient material. The spacers 43 are fitted, as shown in FIGS. 4, 5 and 6, across the post insert top edge 39a and across a top edge of a slot 45, or slots 45, that are formed in the side of which post insert. Two points of spacers 43 contact with the post 22 interior walls are thereby provided for preventing movement of the post 22 relative to the post insert 39.

Figures 13, 15, 16:
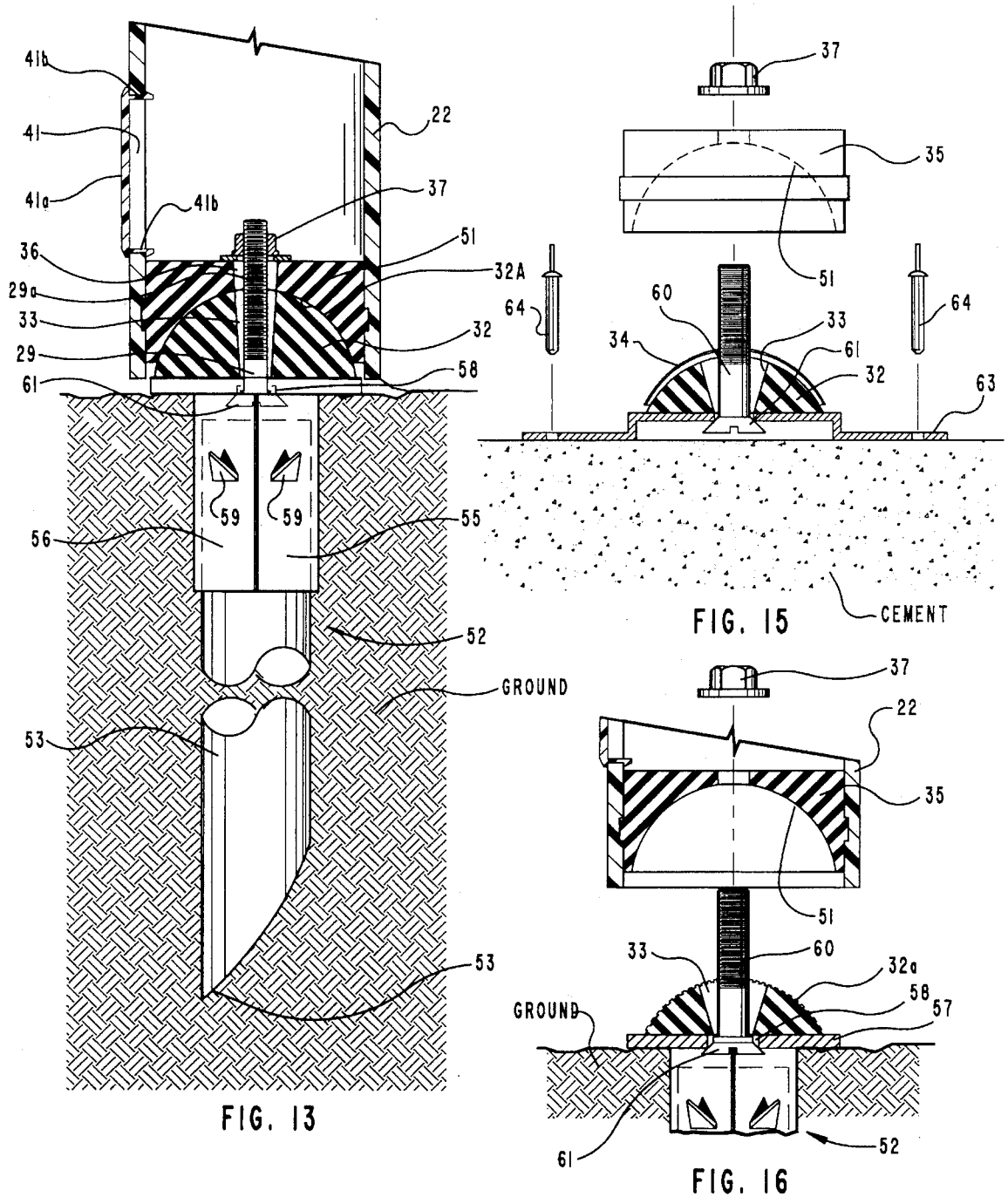
FIG. 13 shows a side elevation view of another embodiment of a ground anchor and a side elevation sectional view of a post insert and post section secured thereto by another variation of a ball segment and seat adjustable mounting of the present invention.
FIG. 15 shows an exploded view of a ball segment and seat adjustable mounting that is like that of FIG. 14 except that it is shown for use with a concrete mounted base plate.
FIG. 16 shows an exploded view of the ball segment and seat adjustable mounting of FIG. 13.

As set out above, the embodiments of the invention shown in FIGS. 1, 6, 7 and 7A, as do the adjustable mountings shown in FIGS. 13, 15, and 16, all employ variations of ball segment and seat mountings between the ground stake and post mount or post insert. The ball and seat arrangement of FIG. 1, and as shown in FIGS. 7 and 7A, is a ball segment 32 for fitting it in a hemispherical seat 51 of the square post insert 35. A gasket 34 is shown sandwiched between which ball segment and seat in FIG. 1 and the ball segment surface is shown roughened at 32a in FIGS. 7 and 7A, for prohibiting relative movement or slippage of the mount components when they are clamped together.

Functionally, the ball segment and seat arrangements of FIGS. 1, 6, 7 and 7A, are alike, as are the ball and seat arrangements of FIGS. 13, 15 and 16. Except that the mountings of FIGS. 1, 6, 13 and 15 include gasket 34, while the mountings of FIGS. 7, 7A, and 16, show as a roughened surface 32a included on the ball segment 32 surface.

FIGS. 13 and 16, involve a tubular or cylindrical ground stake 52, shown best in FIG. 13 as a cylinder 53, that includes a pointed lower end 54. The upper or top end of which cylinder includes a cap 55 that is formed as a square tube with walls 56 and with a flat plate 57 arranged thereover. The cylinder 53 top end is telescoped into and secured in which square tube 55, the flat plate 57 closing off the tube end. Which flat plate 57 has a hole 58 formed therethrough that is counter sunk on the flat plate undersurface to receive a tapered undersurface of a the head 61 of a flat head bolt 60 that is fitted therethrough. Which bolt 60 functions like the described eye bolt 29 except, of course, it relies on a frictional engagement between the countersunk portion of hole 58 and head 61 undersurface to allow a washer nut 37 to be tightened thereover. Otherwise the functioning of which eye bolt 29 and bolt 60 should be taken as being the same.

As shown in FIGS. 13 and 16, the cylinder 53 is to be driven into the ground, pointed end first, as a ground anchor. For further anchoring which cylinder 53, each square tube wall 56 includes a tab 59 cut therein, that cut section then bent outwardly to present an edge to engage and bind into the ground wherein the ground stake is driven, inhibiting its withdrawal.

FIG. 15, shows another post 22 mounting that includes the ball segment 32 secured onto a top surface of a bracket 63 that has a raised center portion and planar sides that are holed for receiving cement fasteners 64 fitted therethrough and driven into a cement, concrete, or like surface, securing the bracket thereto. Which bracket 63 raised center portion is center holed to receive the bolt 60 fitted therethrough prior to mounting. While the bolt head 61 is shown for receiving a screw driver blade, it should be understood that a hex shaped head could be so used as head 61 that would accommodate a wrench head fitted under the bracket 63, to hold that head while the washer nut 37 is turned onto the bolt 60 threaded end.

As set out above the open center portion or hole 33 through the ball segment 32 is tapered from a lesser diameter at its base to a greater diameter at its top, to allow for tilting of bolt 31. Which angle of taper, as shown in FIGS. 7, 7A and 13 is to the vertical. Preferably an angle of taper of up to twenty degrees (20°) is preferred to provide an angle of tilt to the attached post of up to twenty degrees (20°). This tilting capability allows for positioning the post 22 or post insert 39 back to the vertical so as to compensate for the ground stake the top surface not being horizontal.

FIGS. 4 through 6, show another embodiment of a ground stake 65 that includes a platform 66 and pointed stake 67, which stake is shown as having been pounded into the ground. FIG. 5 shows the stake 67 as having displaced from the vertical in that driving, necessitating a topping of the post insert 39 to compensate to position the post 22 telescoped thereon to the vertical.

Hereinabove have been set out a number of ball segment and seat configurations for attaching a post insert 39 onto the top of a ground stake to allow for a tilt of that post insert to where it is in a vertical attitude. FIGS. 4, 4A, 5 and 5A, show another post insert mounting arrangement that also allows for tilting of the post inset 39. As shown, this tilting arrangement consists of a pair of tapered washers 70 and 72, that overlay one another forming a stack. In FIG. 4 the washers 70 and 72 tapered surfaces are shown to slope oppositely, with the top and bottom surfaces of which stack thereby being essentially parallel. To provided for washer positioning each washer includes a tab 71 and 73, respectively, that extends outwardly from the thinnest washer side.

Shown in FIG. 4A the tab 71 of he washer 70 extends for one side of the stack, with the tab 73 of the washer 72 shown extending outwardly from the other stack side, indicating that the washer tapered surfaces slope oppositely. So arranged, the washer stack would have essentially parallel top and bottom surfaces. FIG. 5A shows the tapered washers 70 and 72 as having been turned to where the tabs 71 and 73 align, the tapers overlay one another, providing a tilt to the stack top surface relative to the bottom, as shown in FIG. 5. This tilt, as shown, is to compensate for the positioning of the ground stake pointed stake 67 being at other than the vertical. Functionally, with the tapered washers 70 and 72 positioned to provide a desired angle to the post insert 39, the washer nut 37 is turned onto the bolt, whereafter the post 22 is installed onto the post insert 39, as described above.

Figure 2:
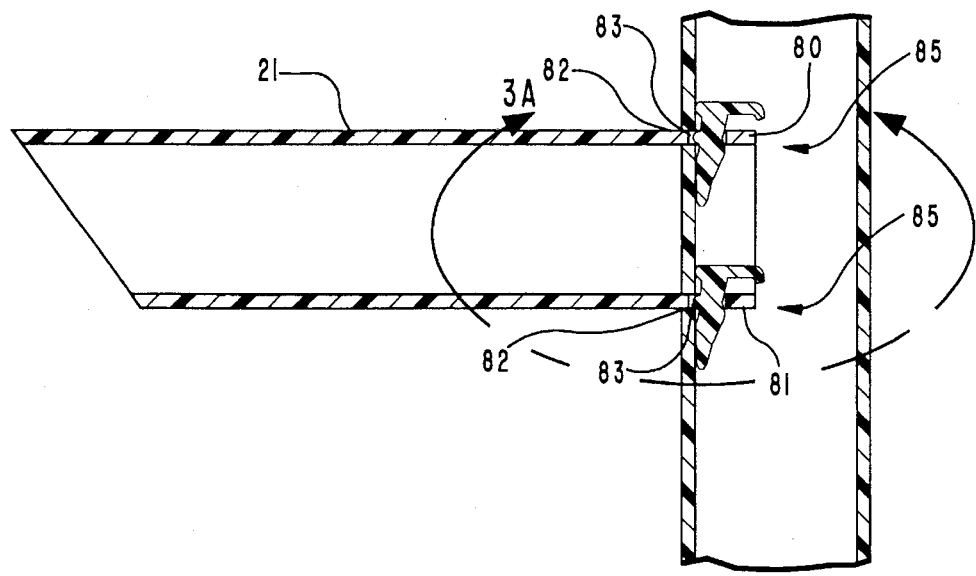
FIG. 2 shows a side elevation sectional view of an upper post portion and tube of FIG. 1.
Figure 19:
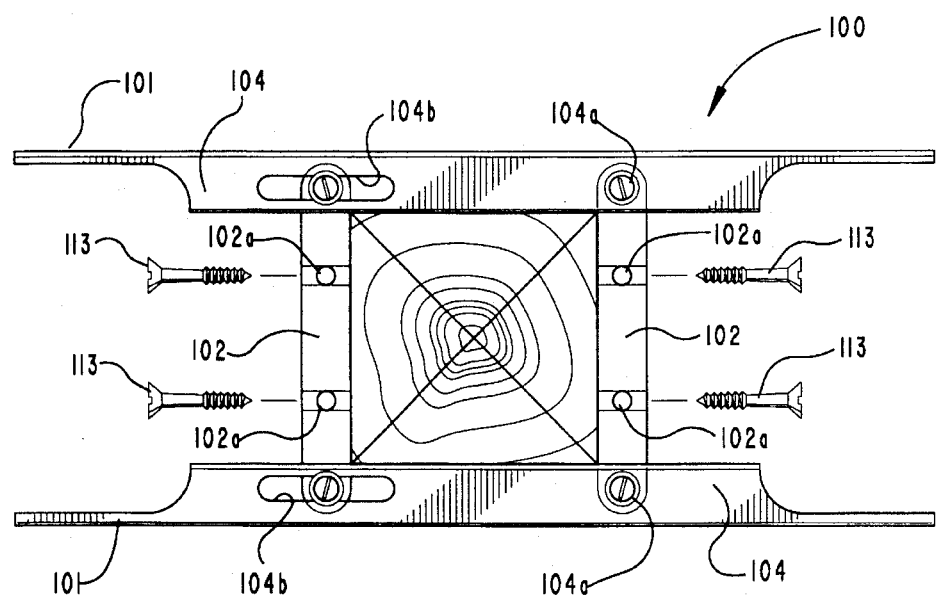
FIG. 19 shows a top plan view of a frame mount like that of FIGS. 17 and 18, except the frame of this embodiment is adjustable and is arranged for mounting a mail box onto a top end of a wood post by screws turned through mount bars and directly into top of a wood post.
Figure 20:
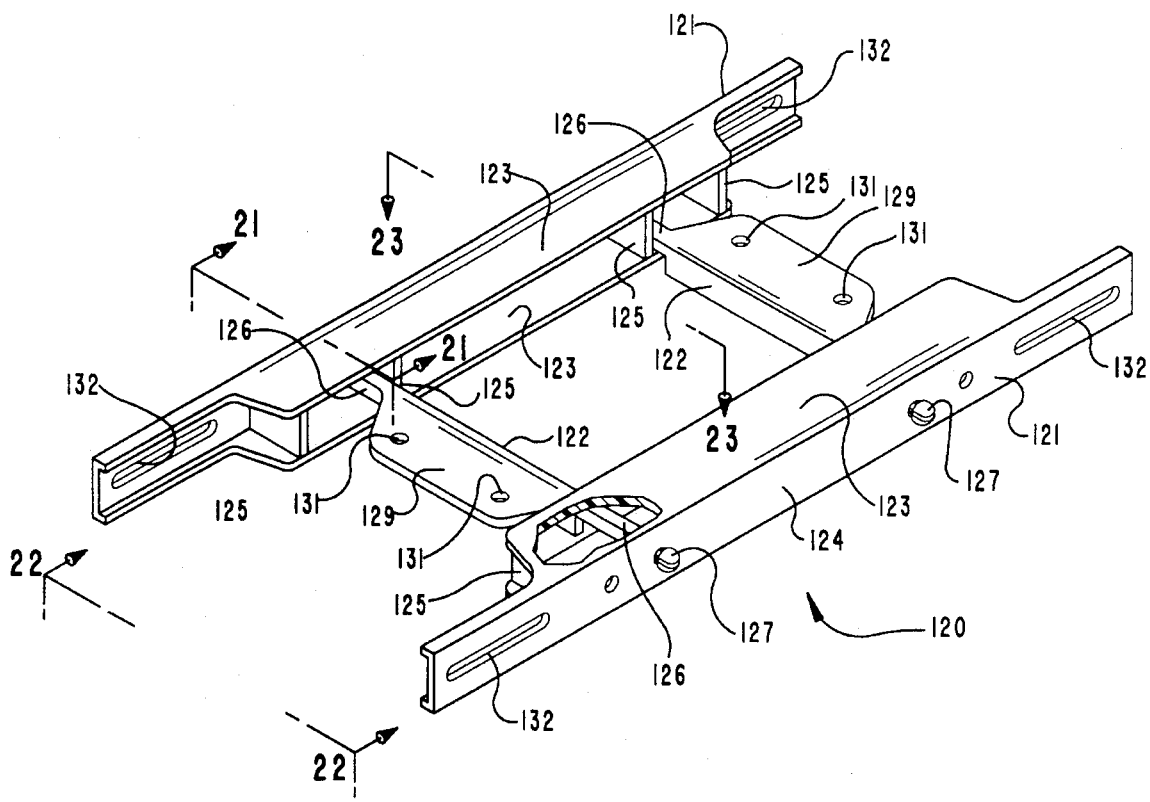
FIG. 20 shows a profile perspective view of an adjustable mail box mount of the present invention.

The post 22 mounted to the post mount 35 or is telescoped over the post insert 39 is then useful for: mounting a newspaper tube 21, or the like, cantilevered outwardly from the post top end, as shown in FIGS. 1 and 2; mounting a mail box mount 75 across a top post end, as shown in FIGS. 10 through 12, to receive a mail box thereon; mounting mail box across the post 22 top end by a frame mount, as shown in FIGS. 19, 20, 23 and 24; mounting a newspaper tube 21, or the like, cantilevered from the post 22 top end that, in turn, mounts a mail box as shown in FIGS. 17 and 18, or mounting a mail box onto a horizontal wood beam, as shown in FIG. 20.

The newspaper tube 21, shown in FIGS. 1 and 2, is preferably an open tube or hollow, the top and bottom sides of which tube at one end, are formed into outwardly extending top and bottom end tabs 80 and 81, respectively. The end tabs 80 and 81 are each for fitting in one of parallel lateral slots 82 formed across a post 22 side, and each end tab 80 and 81 has at least one, and preferably has two holes 83 formed therethrough. To install the newspaper tube 21 cantilevered from the post 22 and receive pegs 85 of FIG. 3C, pegs 90 of FIGS. 3A and 3B, or shear pegs 94 of FIGS. 3D through 3F that are passed through the post 22 top end and are individually fitted through the end tabs 80 and 81 holes 83. This operation is preferably performed manually and accordingly the pegs 85 and 90 and shear pegs 94 are preferably formed from a molded material, such as a plastic, and are configured for ease of installation. FIGS. 1, 2 and 3C show the first peg 85 embodiment that includes a broad head 86 and tapered body 87. A locking ridge 88 is shown extending outwardly from the peg body 87, opposite to broad head 86. Which locking ridge 88, with peg insertion into an end tab hole 83, as shown best in FIG. 3C, extends into the post lateral slot 82, for preventing peg withdrawal.

Figure 3A:
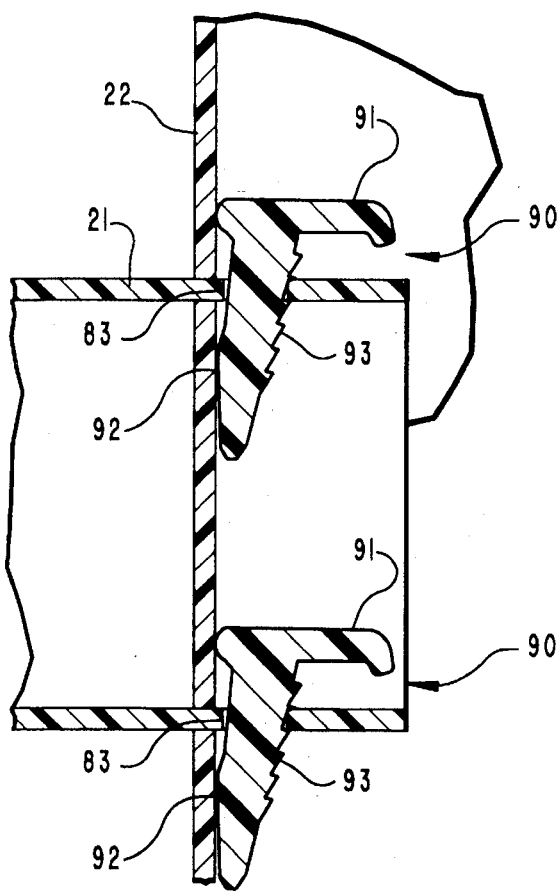
FIG. 3A shows a side elevational sectional view taken within the line 3—3 of FIG. 2.
Figure 3C:
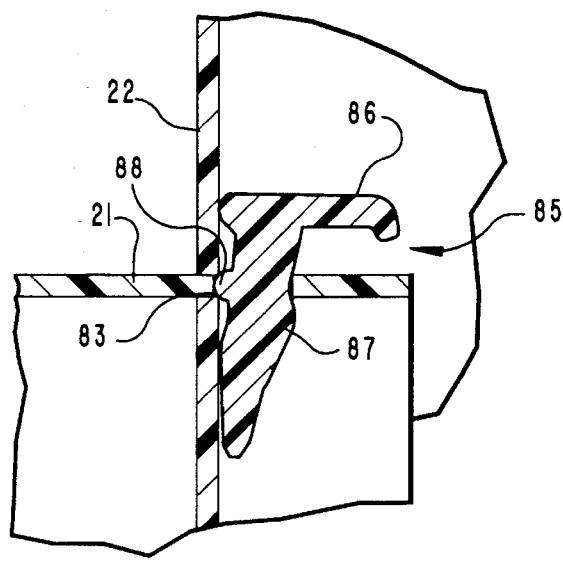
FIG. 3C shows a view like that of FIG. 3B only showing another peg embodiment.

The second peg 90 embodiment is shown in FIGS. 3A and 3B. The peg 90, like the described peg 85, has a broad head 91 and includes a tapered body 92. Rather than a locking ridge, however, the peg 90 includes spaced teeth, serrations, barbs, or threads 93 that are formed along and to extend outwardly from the tapered body 92, below the broad head 91. Shown best in FIG. 3B, with the peg 90 installed in hole 83, a side of one or more of the teeth, serrations, barbs, or threads 93 will engage the tab hole 83 edge, prohibiting peg withdrawal.

Figure 3D:
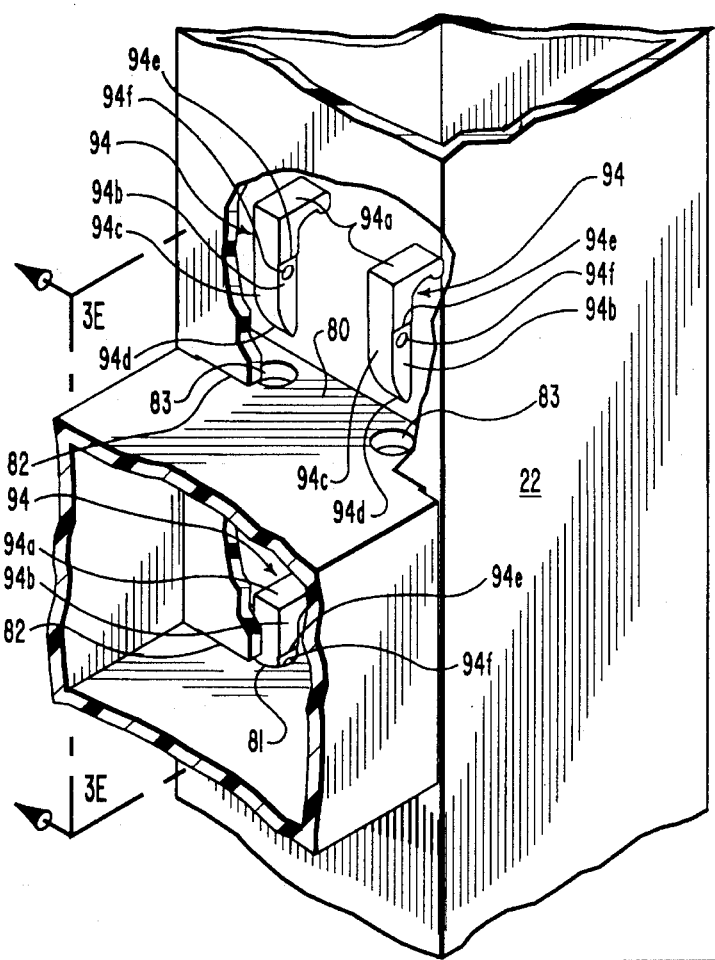
FIG. 3D shows a broken away section of a post and cantilevered tube with shear pegs of the invention aligned for fitting into holes of the parallel tabs of the tube end that has been fitted into parallel slots formed across the post.
Figure 3F:
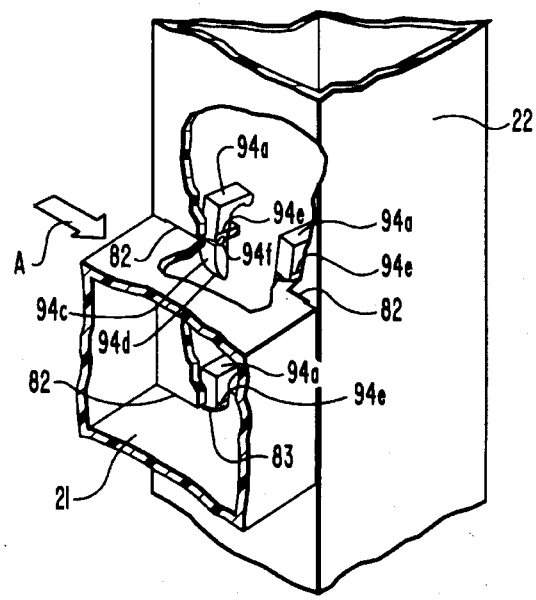
FIG. 3F shows a view like FIG. 3D only showing the shear pegs fully inserted into the tab holes, as showing in FIG. 3E, and showing with arrow A a side force directed against the cantilevered tube causing the shear pegs to each brake across their weakened section.
Figure 3E:
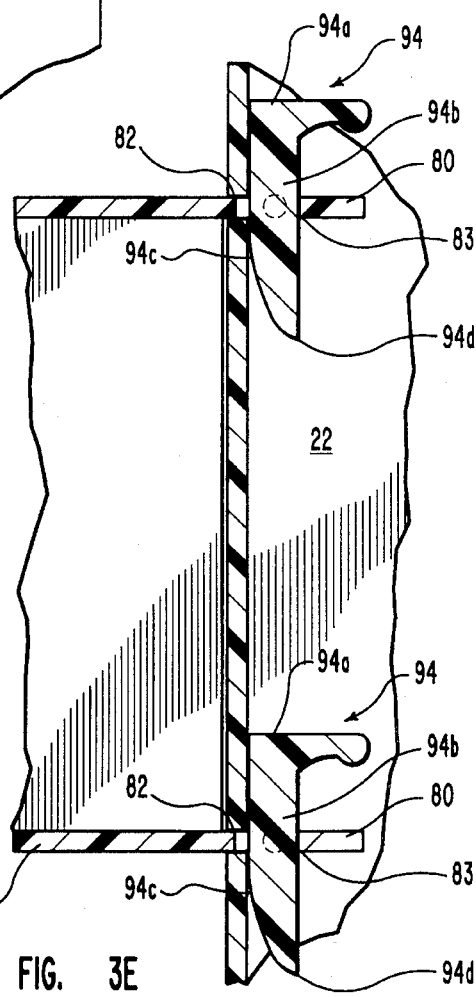
FIG. 3E shows a sectional view take along the line 3E—3E of FIG. 3D.

A shear peg 94 is shown in FIGS. 3D through 3F that, like pegs 85 and 90, includes a broad head 94a with a tapered body 94b. A tapered or curved section 94c of the tapered body 94b, is shown best in FIG. 3E. Distinct from tapered sections of pegs 85 and 90, however, the shear peg tapered or curved section 94c is not immediately below a long section of the broad head 94a, rather, it is formed on the opposite or rear facing side of the tapered body 94b. Shown best in FIG. 3E, the curved section is essentially initially straight, is formed at a right angle to an end of the broad head 94a, and curves toward a tapered body 94b front side, terminating in a pointed end 94d. Preferably, the tapered boy 94b sides are stepped inwardly at a stepped section 94e formed in each side across the body, and proximate to the middle thereof, which stepped sections 94e provide for narrowing the tapered body cross section from the middle thereof to the pointed end 94d. The lateral stepped section 94e is for positioning, as shown in FIGS. 3D and 3F, to be slightly above the edge of tab holes 83. To encourage separation or peg shearing along the lateral stepped section 94e, as with an application of a side force to the tube 21, shown as arrow A in FIG. 3F, such forces directed through the cantilevered tube 21, and into a hole or depression 94f that is formed into the shear peg tapered body 94b. The combination of the narrowing of the shear peg 94 at the lateral stepped section 94c and the hole or depression 94f, provides for a shear peg weakening thereacross that will encourage the peg to break across the depression 94f, as shown in FIG. 3F. So arranged, a force, arrow A, applied to the tube 21 to bend it across the coupling to post 22 will tend to break the shear pegs 94, as illustrated by the cracks shown in the shear pegs in FIG. 3F, allowing the tube tabs 80 to pull out of slots 82, separating the tube 21 from the post 22 without damage to the post.

A cap 95, shown in FIGS. 1 and 2, is preferably installed onto, to cover, the post 22 open top end. Prior to which cap 95 installation the pegs, as described, are fitted through that post open end and into the tab holes 83. Which cap 95, shown in FIGS. 10 through 12, is replaced by mail box mount 75, or a mail box mounted thereon. Which mail box mount 75 consists of a flat top plate 76 that has downwardly extending right angle flanges 77 that project from along opposite edges. Equidistantly spaced plates 78 are secured across which downturned flanges 77, the flanges and plates thereby forming a square center recess that is for receiving a square post 22 end fitted therein. For providing overlying coupling surfaces where the flanges intersect the post surfaces, opposite side end sections of which post 22 may be removed leaving tabs 79. Shown best in FIGS. 11 and 12, the tabs 79 and plates 78 are to be fitted together in juxtaposition arrangement with holes 79a through each aligned to receive pins 79b fitted therein securing the mail box mount 75 onto the post 22 end. So arranged, the flat top plate 76 is for receiving a mail box secured thereon.

FIGS. 17 and 18 show another mounting 100 for a mail box 110. The mounting 100 includes a pair of brackets 101 that are each connected to the ends of a pair of parallel bars 102. The bars 102 space the brackets 101 apart in parallel relationship forming a rectangular frame. To construct this frame, each bracket 101 includes as a pair of flanges 104 that extend outwardly and parallel from along the top and bottom edges, respectively, of a bracket web. The bar 102 ends are for fitting between which flanges 104, each receiving a coupling device, that is preferably a pivot, and is fitted through the bracket flanges and a bar end. The bars 102 have holes 105 formed through the mid-portions thereof for receiving fasteners 106, as set out below. Which mounting 100 is either for mounting onto the top surface of the newspaper tube 21 that is cantilevered from a top end portion of post 22, as shown in FIGS. 17 and 18 or onto a post 22 end, as shown in FIG. 19.

To provide for mounting mail box 110, as shown in FIGS. 17 and 18,the bracket 101 webs, proximate to their ends, include longitudinal slots 103 that receive fasteners, shown as bolts 107, fitted therethrough and through corner holes formed in a cover 111 of mail box 110. Prior to which mail box 110 mounting fasteners 106, shown as bolts, are fitted through center openings 105 formed through the bars that are, in turn, fitted through holes formed through the newspaper tube 21 top, with nuts 106a, shown in FIG. 18, turned over the bolt ends. Wood screws can be used in place of bolts 106 and nuts 106a, within the scope of this disclosure. With the frame mounted to the newspaper tube 21, the mail box 110 is seated, as set out above, and the bolts 107 are fitted through the mail box cover corner holes and through the bracket web slots 103 to receive washers 109 and nuts 108 turned onto which bolt 107 ends, as shown best in FIG. 18.

FIG. 19 shows another framed arrangement for mounting a mail box onto a post 22 end, which post 22 is shown as formed of wood, through it could be formed of solid plastic, or could be tubular with a top end insert, or a like arrangement, within the scope of this disclosure. The frame arrangement of FIG. 19, like that of FIG. 17, includes a pair of brackets 101, each with parallel flanges 104 extending from the edges thereof, and with a pair of bars 102 for positioning between which brackets. One of which bars 102, like the arrangement of FIG. 17, is connected at its ends between the flanges 104 by fasteners 104a, with the other bar 102 ends mounted to slide freely in longitudinal slots 104b formed in the flanges 104. With the mounting 100 fitted onto a post top end, shown in FIG. 19 as a wood post, and the bar 102 whose ends are mounted in longitudinal slots 104b moved to where the bar holes 102a in both bars 102 aligned with the wood post top surface, screws 113, or the like, are turned through holes 102a and into the post top, securing the mounting 100 thereto. Thereafter the mail box 110 is installed to the mounting as described hereinabove with respect to FIGS. 17 and 18.

Figure 21:
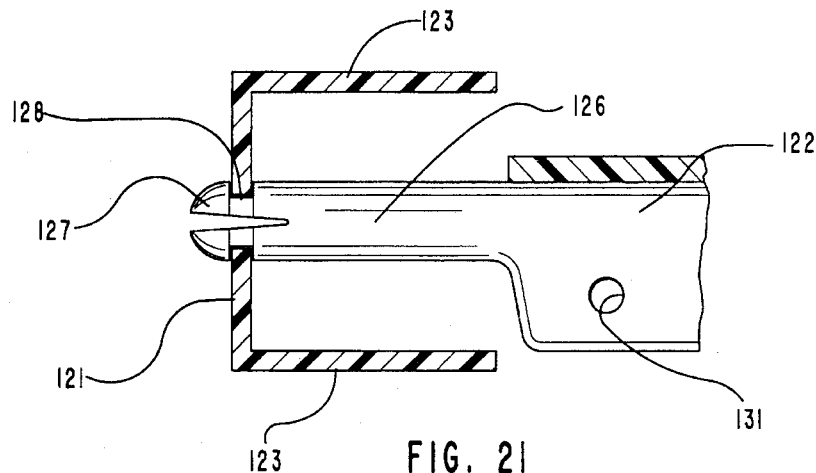
FIG. 21 shows an enlarged end sectional view of the mail box pivoting cross bar taken within the line 21—21 of FIG. 20.
Figure 22:
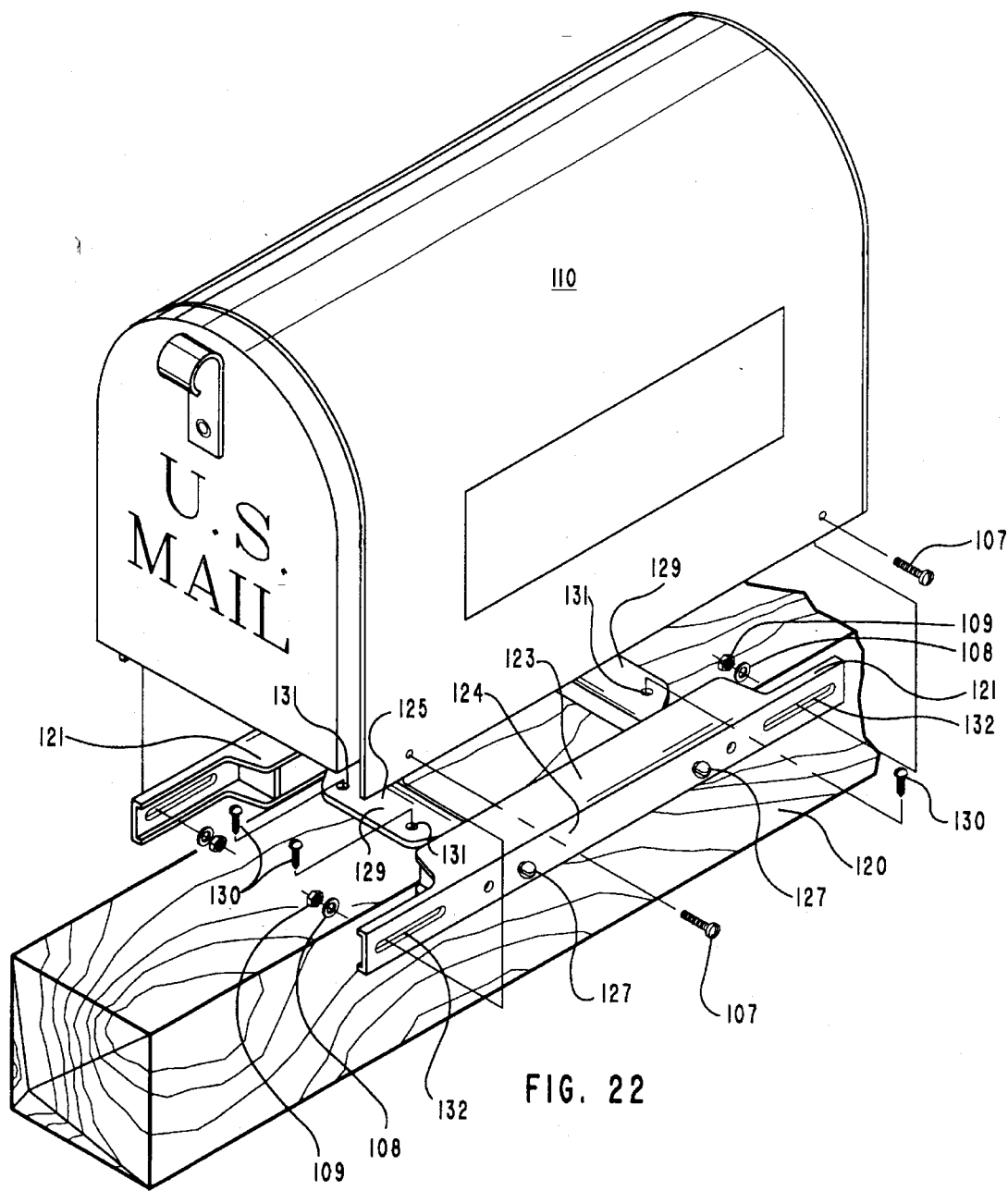
FIG. 22 shows a perspective view of the adjustable mail box mount of FIG. 20 utilized for mounting a mail box onto a wood beam.
Figure 23:
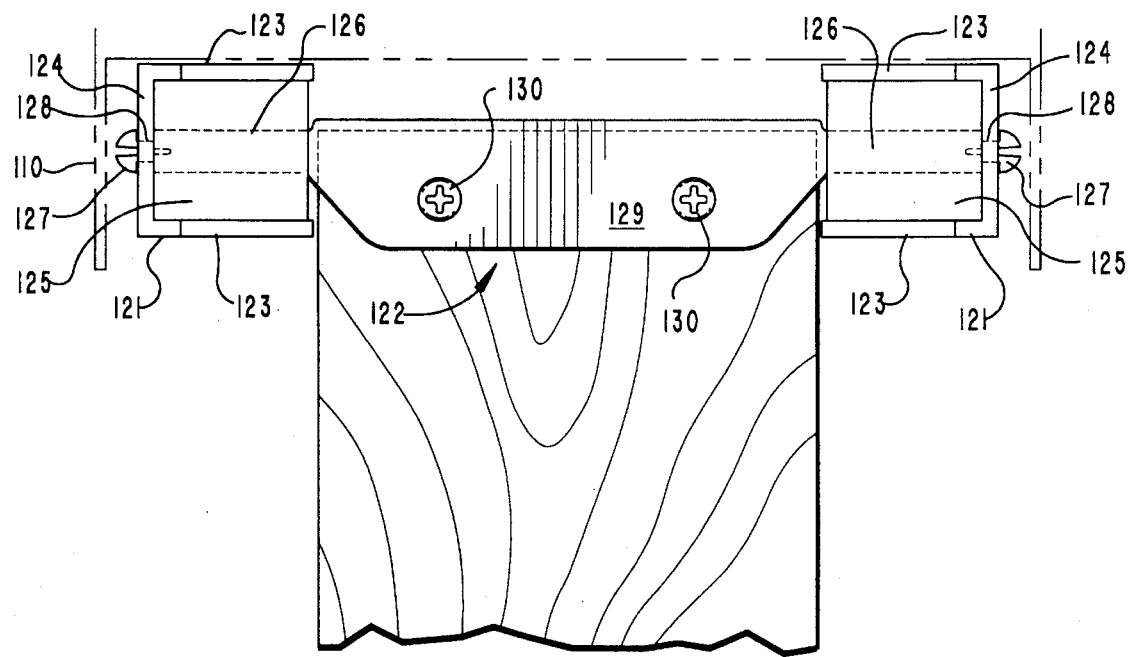
FIG. 23 shows an end elevation view of the adjustable mail box mount of FIG. 20 mounting a mail box onto a wood post end, the pivoting cross bar shown pivoted to the vertical, with screws turned therethrough and into the post sides.
Figure 24:
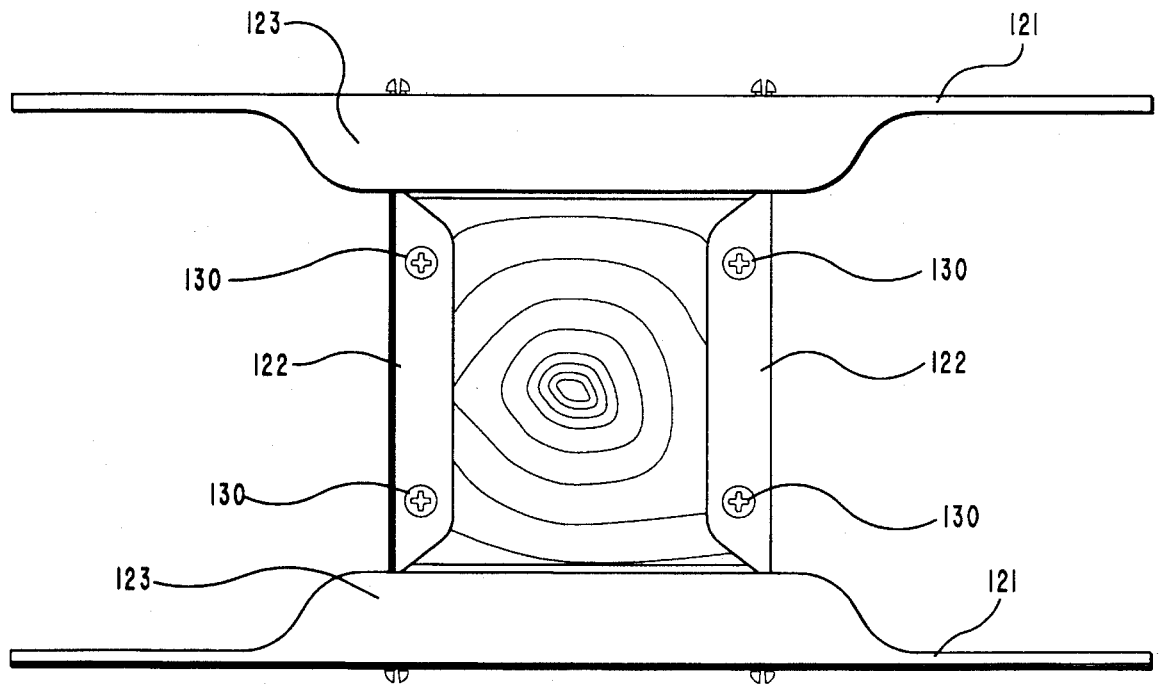
FIG. 24 shows a top plan view of the adjustable mail box mount of FIG. 20, with the pivoting cross bars shown pivoted to the horizontal and with screws turned therethrough and into the end of a wood post.

FIG. 20 shows another embodiment of a mounting 120 for mail box 110. The mounting 120, like the mounting 100, includes a pair of brackets 121 with bars 122 arranged therebetween. The brackets 121 each include parallel flanges 123 extending from opposite edges of a mid-section of a web 124, and include cross braces 125 secured therebetween, providing a rigid bracket structure. Shown best in FIGS. 20 and 21, the bar 122 ends are each necked down into sleeve 126 that is drilled longitudinally and threaded to receive a bolt 127 turned therein. Each bolt 127, as shown best in FIGS. 21 and 23, is fitted though a hole 128 formed through the bracket 121 and turned into the bar sleeve 126 end, forming a pivot coupling of which bar to the bracket. The bar 122 pivot coupling allows end bar to be pivoted to the attitudes shown, respectively: in FIGS. 20 and 22, where wide mid-portions 129 of each bar 122 extend oppositely; in FIGS. 21 and 23 where the mid-portions 129 are parallel and point downwardly; and FIG. 24, where in mid-portions 129 point towards one another. Which bar 122 positioning is maintained by turning the bolt 127 fitted through flange hole 128 tightly into the bar sleeve 126. With the bar 122 appropriately positioned fasteners, such as screws 130 can be turned through holes 131 formed in the bar mid-portions and into a wood beam, like that shown in FIG. 22, or into a top end of a wood post, like that shown in FIGS. 23 and 24, securing the mounting 120 onto which beam or post end. Thereafter, a mail box 110 can be mounted onto which mounting 120 utilizing the bolts, nuts, and washers 107, 108, and 109, respectively, shown in FIG. 17, secured through elongate slots 132, formed in the bracket 121 ends, as shown in FIG. 22. Where the mounting 120 is shown utilized for attaching a mail box 110 onto a wood beam or wood post, it should be understood that, like mounting 100 it can be used also for mounting a mail box onto a cantilevered plastic tube or post end, or like beam or post arrangement, within the scope of this disclosure.

Herein have been shown and described preferred arrangements of a post system and component elements and mountings thereof of the present invention. It should, however, be understood that the present disclosure is made by way of example only and that changes can be made thereto without departing from the subject matter coming within the scope of the following claims, and a reasonable equivalency thereof, which claims I regard as my invention.

I claim:

1. A cantilever tube mounting system comprising, a straight tube; a straight post that is open longitudinally at a top end and is mounted to extend upwardly from the ground; means for mounting said tube cantilevered from the side of an open portion of said post consisting of, at least one transverse slot formed across one post face and into said post open portion, at least one tab formed as an extension of said tube end for fitting in said post slot, which said tab includes at least one hole formed therethrough; and peg fastener means for fitting through each said tab hole, formed form a resilient material having a broad head with a flat top surface as a proximal end and is secured off center to a lower portion of said peg fastener means that has first and second sides extending from an undersurface of said broad head tapering into a pointed distal end, with said second side for engaging an edge of said tab hole wherein said peg fastener means is installed and said first side includes a projection means that extends therefrom for fitting into said post slot when said peg fastener means is installed in said tab hole.

2. A cantilever tube mounting system as recited in claim 1, wherein the lower portion includes, as the projection means a ridge formed across the first side extending therefrom.

3. A cantilever tube mounting system as recited in claim 1, wherein the peg fastener means second side includes, a plurality of upwardly sloping teeth, serrations, barbs, or threads that are spaced therealong for sliding over the tab hole edge as said peg fastener means is installed in said tab hole, inhibiting peg fastener means removal.

4. A cantilever tube mounting system as recited in claim 1, further including a shear means formed across the peg fastener means lower portion at approximately a location whereat said peg fastener means will travel into the tab hole, said shear means to break when a force is directed through the tube sufficient to separate said tube from the post.

5. A cantilever tube mounting system as recited in claim 4 wherein the shear means is a depression formed in at least one side of the peg fastener means lower portion.

6. A cantilever tube mounting system as recited in claim 4, wherein the shear means in an inward stepped section formed across the peg fastener means lower portion.

7. A cantilever tube mounting system as recited in claim 1, wherein the peg fastener means lower portion first side is at a right angle to an end of the broad head flat top surface and, from approximately a mid-point thereof, is curved inwardly to engage the second side that is straight and extends a bottom surface of said broad head, forming the pointed distal end.

8. A cantilever tube mounting system as recited in claim 7, further including an inwardly stepped section formed across the peg fastener means lower portion at a position therealong that will be approximately the depth of penetration of said peg fastener means will travel into the tab hole; and a depression is formed in at least one side of said peg fastener means lower portion adjacent to said stepped section that provides for weakening said peg fastener means thereacross.

* * * * *